(12) United States Patent
Peterson (10) Patent No.: US 7,457,128 B2
(45) Date of Patent: Nov. 25, 2008

(54) FLEXIBLE CELL CONFIGURATION FOR MULTI-PROCESSOR SYSTEMS

(75) Inventor: Eric C. Peterson, McKinney, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 354 days.

(21) Appl. No.: 11/187,302

(22) Filed: Jul. 22, 2005

(65) Prior Publication Data

US 2007/0019390 A1 Jan. 25, 2007

(51) Int. Cl.
*H05K 7/00* (2006.01)
(52) U.S. Cl. .................. 361/728; 361/748; 361/679
(58) Field of Classification Search ......... 361/748–749, 361/679, 600, 784–789; 174/250, 68.1, 261, 174/262
See application file for complete search history.

(56) References Cited

U.S. PATENT DOCUMENTS

| | | | |
|---|---|---|---|
| 5,170,554 A | 12/1992 | Davis et al. | |
| 6,047,391 A | 4/2000 | Younis et al. | |
| 6,202,110 B1 * | 3/2001 | Coteus et al. | 710/301 |
| 6,452,789 B1 | 9/2002 | Pallotti et al. | |
| 6,684,343 B1 | 1/2004 | Bouchier et al. | |
| 6,697,349 B2 | 2/2004 | Mathis et al. | |
| 6,704,195 B2 * | 3/2004 | Cravens et al. | 361/687 |
| 6,725,317 B1 | 4/2004 | Bouchier et al. | |
| 6,768,640 B2 * | 7/2004 | Doblar et al. | 361/695 |
| 2007/0112986 A1 * | 5/2007 | Chang | 710/116 |

* cited by examiner

*Primary Examiner*—Hung S Bui (57) ABSTRACT

A cell configuration for a multi-processor system comprises: a first circuit board comprising: a single processor; a single processor agent coupled electrically to the single processor; and a plurality of memory modules coupled electrically to the single processor agent; a second circuit board comprising: a single processor; a single processor agent coupled electrically to the single processor; and a plurality of memory modules coupled electrically to the single processor agent; and wherein the first and second circuit boards are inter-connected in such a manner to form an electrical connection between the single processor of the first circuit board and the single processor agent of the second circuit board and an electrical connection between the single processor of the second circuit board and the single processor agent of the first circuit board.

22 Claims, 8 Drawing Sheets

FLEXIBLE CELL CONFIGURATION FOR MULTI-PROCESSOR SYSTEMS

BACKGROUND OF THE INVENTION

Multi-processor systems, like servers, for example, generally comprise multi-socket printed circuit (PC) boards, referred to as cells or cell boards, which are interconnected through a backplane arrangement. Each cell board may include: a plurality of processors, usually one for each available socket; memory associated with each processor; and a controller or processor agent subsystem for facilitating communication among the processors, memory and other subsystems. These cell boards are considered the basic building blocks of the system. Accordingly, the server system is assembled by inserting as many cell boards as are needed into the backplane for a particular application. An example of a packaging architecture for a multi-processor server is disclosed in the U.S. Pat. No. 6,452,789, granted Sep. 17, 2002, entitled "Packaging Architecture For 32 Processor Server", and assigned to the same assignee as the instant application, the contents of which being incorporated by reference herein in its entirety.

While these cell boards have been found to satisfy the building block assembly of different server products and applications, they are not without improvement. For example, it is desirable to have a set of circuit board building blocks that are more flexible in building the different multi-processor system applications.

SUMMARY

In accordance with one aspect of the present invention, a cell configuration for a multi-processor system comprises: a first circuit board comprising: a single processor; a single processor agent coupled electrically to the single processor; and a plurality of memory modules coupled electrically to the single processor agent; a second circuit board comprising: a single processor; a single processor agent coupled electrically to the single processor; and a plurality of memory modules coupled electrically to the single processor agent; and wherein the first and second circuit boards are inter-connected in such a manner to form an electrical connection between the single processor of the first circuit board and the single processor agent of the second circuit board and an electrical connection between the single processor of the second circuit board and the single processor agent of the first circuit board.

DETAILED DESCRIPTION OF THE INVENTION

The present embodiment comprises a new set of circuit boards, each with a different component division, so that they may be assembled together in various combinations to form cell configurations with different capabilities that are more flexible in satisfying the needs of the myriad of multi-processor system products and differing applications thereof.

The new circuit board set may include a cell memory circuit board and a memory expander circuit board. In the present embodiment, the boards of the new set are of the same size and may be interchangeable for plugging into slots of the backplane. The cell memory board may comprise one socket for a processor integrated circuit (IC), one processor agent or controller IC and associated memory which may be in the form of dual in-line memory modules or DIMMs. That is, each processor agent may be associated with a predetermined amount of memory, like eight (8) DIMMs, for example. The memory expander board may comprise two processor agents and their associated memory. Each board may include one or more power subsystems for regulating power to the various components on the board.

Figure 1:
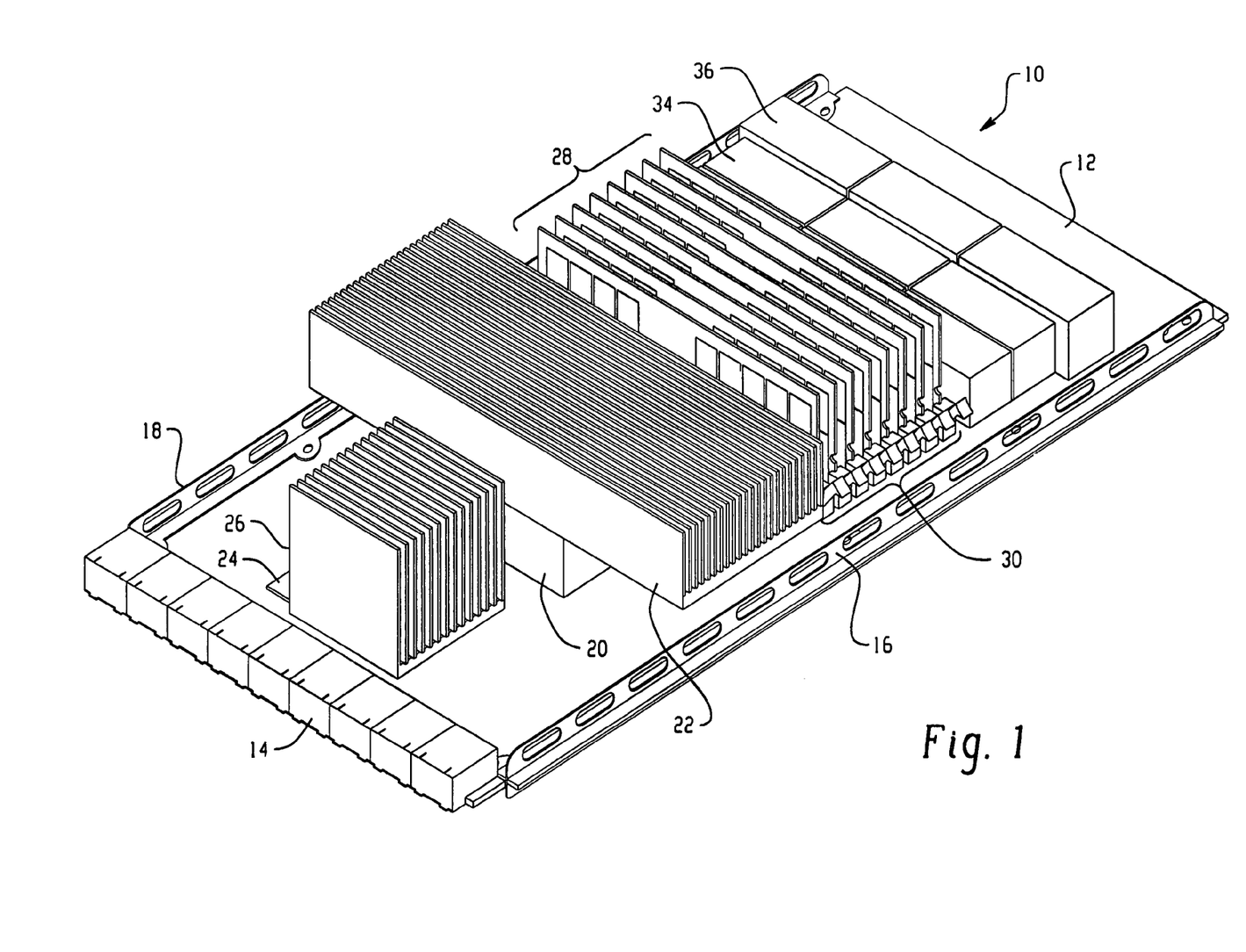
FIG. 1 is an isometric perspective view of an exemplary cell memory board.
Figure 2:
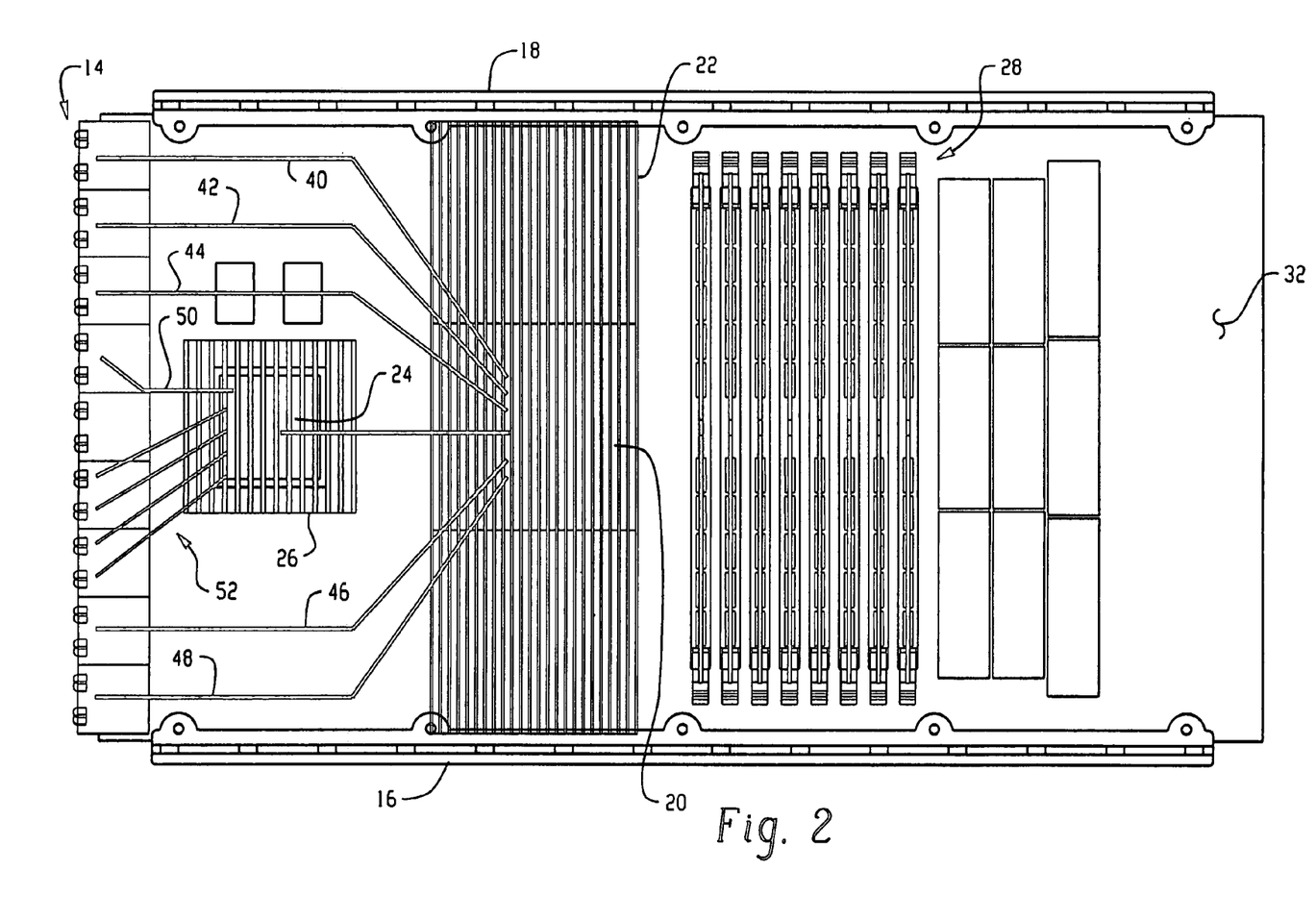
FIG. 2 is a top or plan view of the cell memory board depicted in FIG. 1.

An exemplary cell memory board 10 is shown in an isometric view in FIG. 1 and in a top or plan view in FIG. 2. Referring to FIGS. 1 and 2, the cell memory board 10 comprises a PC board 12 having printed circuit runs disposed thereon for interconnecting the various components connected thereto. Attached across the back end of the PC board 12 is a row of connectors 14 which may be of the type manufactured by TYCO under the model no. HMZd, for example. The connectors 14 are used to interconnect board 12 to a slot of a backplane in much the same manner as the system described in U.S. Pat. No. 6,452,789 referenced herein above. As shown in FIG. 2, the pins of the connectors 14 may be connected through PC runs to the various components of the board 12 as will become more evident from the following description. The cell memory board 10 also includes slotted side panels 16 and 18 attached to the sides of board 12 to provide structural support and cooling air flow therefor.

On the board 12 is disposed a processor IC 20 which may be of the type manufactured by Intel Corporation under the model name Itanium, for example. The processor IC 20 may be interconnected to PC runs of board 12 via an appropriate IC socket. Disposed on the IC 20 may be a finned heat sink 22 appropriately attached to conduct heat away from the IC 20 and maintain it at a safe operating temperature. Also disposed on board 12 is a processor agent IC 24 which may be of the type manufactured by Hewlett-Packard Company, for example. The processor agent IC 24 facilitates communications between the processors, memory subsystem, router chips, crossbar chips, and remote I/O. The processor acient IC 24 is connected to processors and memory subsystems on the board 12 via a wiring net. For example, a memory request from a processor is passed to the memory subsystem through the processor agent IC 24. Note that the processor agent IC 24 is the controller for both the processors and the memory subsystem. The agent IC 24 may be also connected to the connectors 14, processor 24 and associated memory via PC runs of board 12. Disposed on the IC 24 may be a finned heat sink 26 appropriately attached to conduct heat away from the IC 24 and maintain it at a safe operating temperature.

Also disposed on board 12 is a row of DIMMs 28 which include memory associated with the processor agent 24. Each DIMM of the row 28 may be of the type corresponding to the DDR II DIMM or FBD specifications, for example. The DIMMs 28 may be connected to board 12 through a corresponding row of suitable connectors 30 and to the processor agent 24 via PC runs of board 12. In the present embodiment, there are eight (8) DIMMs associated with the processor agent 24 with each DIMM comprising one-hundred and twenty eight megabits (128 Mb) of memory storage.

Further disposed on board 12 in an area 32 towards the front of the board may be a power subsystem comprising one or more power regulation modules 34 and perhaps an associated bus bar module 36 for supplying power at the proper voltage level(s) to the various circuit components of board 12. The power subsystem modules 34 and 36 may connect through one more of the connectors 14 to the backplane for power supply. While the power subsystem is shown disposed on the board 12, this may not be the case in all applications. In some applications, the power subsystem may be disposed just as well on the backplane without deviating from the broad principles of the present invention.

The row of connectors 14 is shown in greater detail in the plan view of FIG. 2. Referring more specifically to FIG. 2, in the present embodiment, there are nine (9) connector sections in the row 14. The three (3) connector sections at the top of the row and the two (2) connector sections at the bottom of the row are referred to as CSI Links and are connected respectively through PC runs 40-48 to the processor IC 20. CSI Links is a standard developed by Intel Corporation for performing point to point connection between two electrical components. The next two connector sections in row 14 going from top to bottom are Agent CSI Links, each of which being connected to the processor agent IC 24 through PC runs 50. An Agent CSI Link is the CSI Link standard applied to a processor agent.

The two final connector sections are referred to as SP2+ Links and are connected to the processor agent IC 24 through PC runs 52. SP+ Links is a modified CSI Link standard. In the present embodiment, these SP2+ Links connections are used to interconnect the components on the cell memory board with X-Bars to form the system interconnect fabric. The SP2+ Links are provided in the connector section of the cell memory board in positions corresponding to SP2+ Links positions on the memory expander board as will become more evident from the following description.

Figure 3:
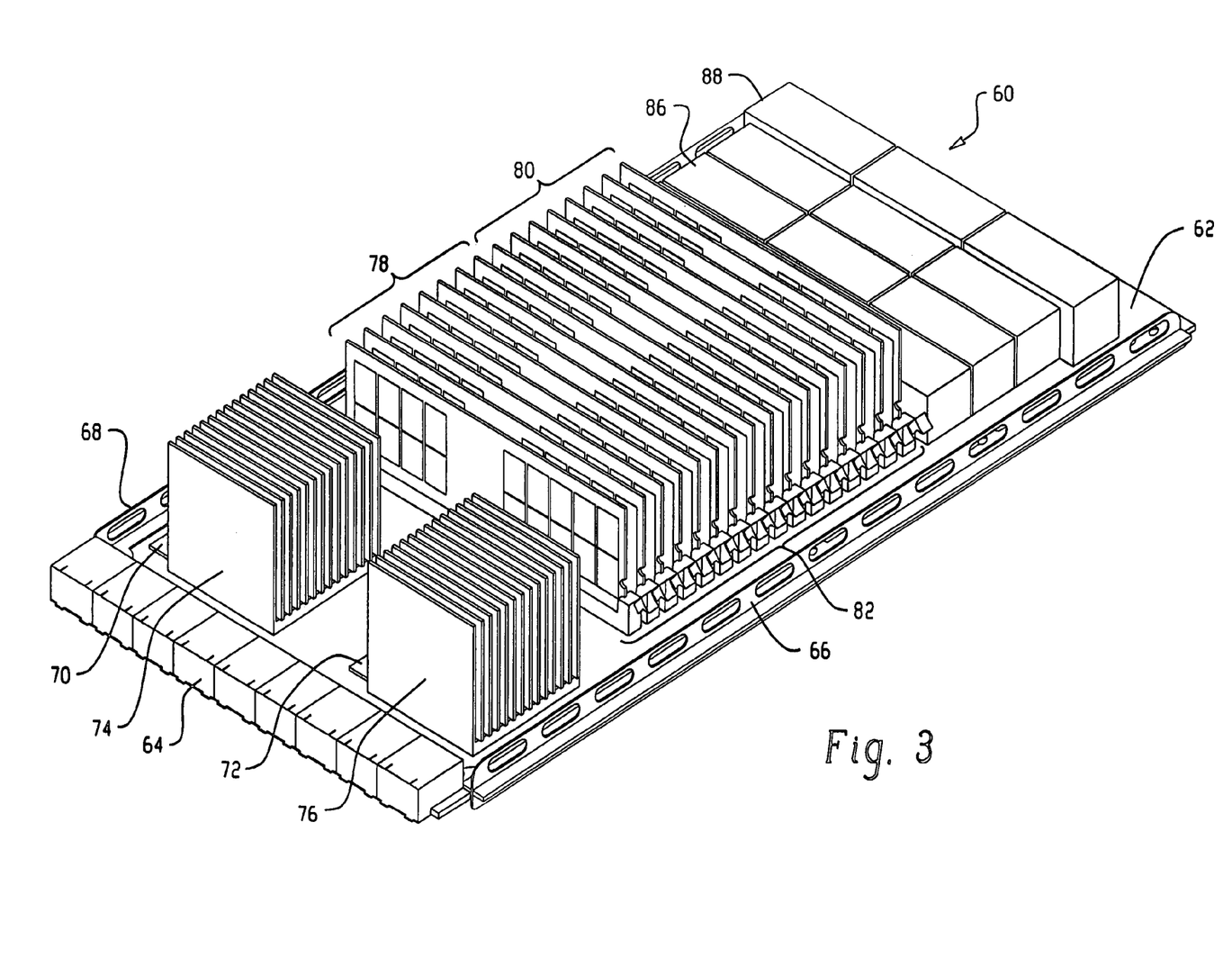
FIG. 3 is an isometric perspective view of an exemplary memory expander board.
Figure 4:
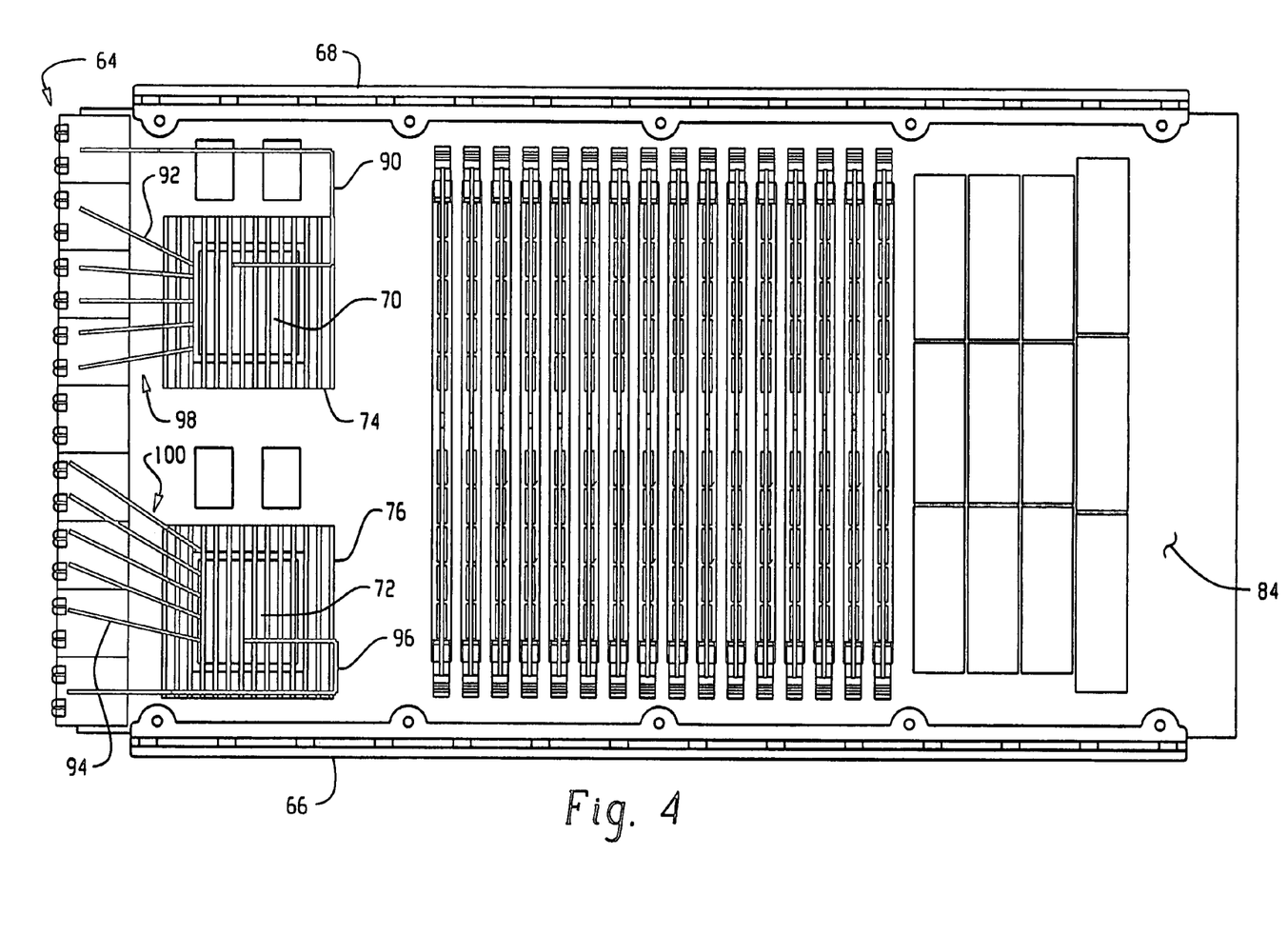
FIG. 4 is a top or plan view of the memory expander board depicted in FIG. 3.

An exemplary memory expander board 60 is shown in an isometric view in FIG. 3 and in a top or plan view in FIG. 4. Referring to FIGS. 3 and 4, the memory expander board 60 comprises a PC board 62 having printed circuit runs disposed thereon for interconnecting the various components connected thereto. Attached across the back end of the PC board 62 is a row of connectors 64 which may be of the same type as described supra for the cell memory board 10, for example. The connectors 64 are used to interconnect board 62 to a slot of a backplane in much the same manner as the system described in U.S. Pat. No. 6,452,789 referenced herein above. As shown in FIG. 4, the pins of the connectors 64 may be connected through PC runs to the various components of the board 62 as will become more evident from the following description. The memory expander board 60 also includes slotted side panels 66 and 68 attached to the sides of board 62 to provide structural support and cooling air flow therefor.

Disposed on board 62 are two (2) processor agent ICs 70 and 72 which may be of the same type as described supra for the cell memory board 10, for example. The agent ICs 70 and 72 may be also connected to the connectors 64, and associated memory via PC runs of board 62. Disposed on the ICs 70 and 72 may be finned heat sinks 74 and 76, respectively, appropriately attached to conduct heat away from the ICs 70 and 72 and maintain them at a safe operating temperature.

Also disposed on board 62 are two adjacent rows 78 and 80, each row including eight (8) DIMMs. Each row 78 and 80 of DIMMs is memory associated with the processor agents 70 and 72, respectively. The DIMMs of the rows 78 and 80 may be of the same type as described supra for the cell memory board 10, for example. The DIMMs of rows 78 and 80 may be connected to board 62 through a corresponding row of suitable connectors 82 and to their respective processor agents 70 and 72 via PC runs of board 62. In the present embodiment, there are eight (8) DIMMs associated with a processor agent with each DIMM comprising 128 Mb of memory storage; however, it is understood by all those skilled in the pertinent that this division of memory in the DIMMs is merely by way of example and that other memory divisions may work just as well.

Further disposed on board 12 in an area 84 towards the front of the board may be a power subsystem comprising one or more power regulation modules 86 and perhaps an associated bus bar module 88 for supplying power at the proper voltage level(s) to the various circuit components of board 62. The power subsystem modules 86 and 88 may connect through one more of the connectors 64 to the backplane for power supply. While the power subsystem is shown disposed on the board 62, this may not be the case in all applications. In some applications, the power subsystem may be disposed just as well on the backplane without deviating from the broad principles of the present invention.

The row of connectors 64 is shown in greater detail in the plan view of FIG. 4. Referring more specifically to FIG. 4, in the present embodiment, there are nine (9) connector sections in the row 64. The connector sections of row 64 are disposed in the same relative position to the memory expander board as the connector sections of row 14 are disposed to the cell memory board. The two (2) connector sections at the top of the row and the two (2) connector sections at the bottom of the row are referred to as Agent CSI Links. The top pair of CSI Links connector sections are connected respectively through PC runs 90 and 92 to the processor agent IC 70. The bottom pair of CSI Links connector sections are connected respectively through PC runs 94 and 96 to the processor agent IC 72. The CSI Links are located on the memory expander board per convenience to allow for the desired connections between boards.

The next pair of connector sections in row 64 going from top to bottom are the SP2+ Links and are connected to the processor agent IC 70 through PC runs 98. The next connector section from top to bottom is left empty and the final or bottom pair of connector sections are additional SP2+ Links and are connected to the processor agent IC 72 through PC runs 100. Note that, in the present embodiment, the bottom pair of SP2+ Links connector sections are disposed in the same position in the row of connector sections for both the cell memory and memory expander boards.

As indicated above, the cell memory and memory expander boards of the present embodiment may be connected in various combinations to form cells of different capabilities for different multi-processor system products and applications. For example, for a midrange server application, a cell may be configured by combining two of the exemplary cell memory boards described supra as shown by way of example in the plan view of FIG. 5 and the connector section interface view of the two cell memory boards of FIG. 5A. This combination provides for a two processor logical cell configuration.

Figure 5:
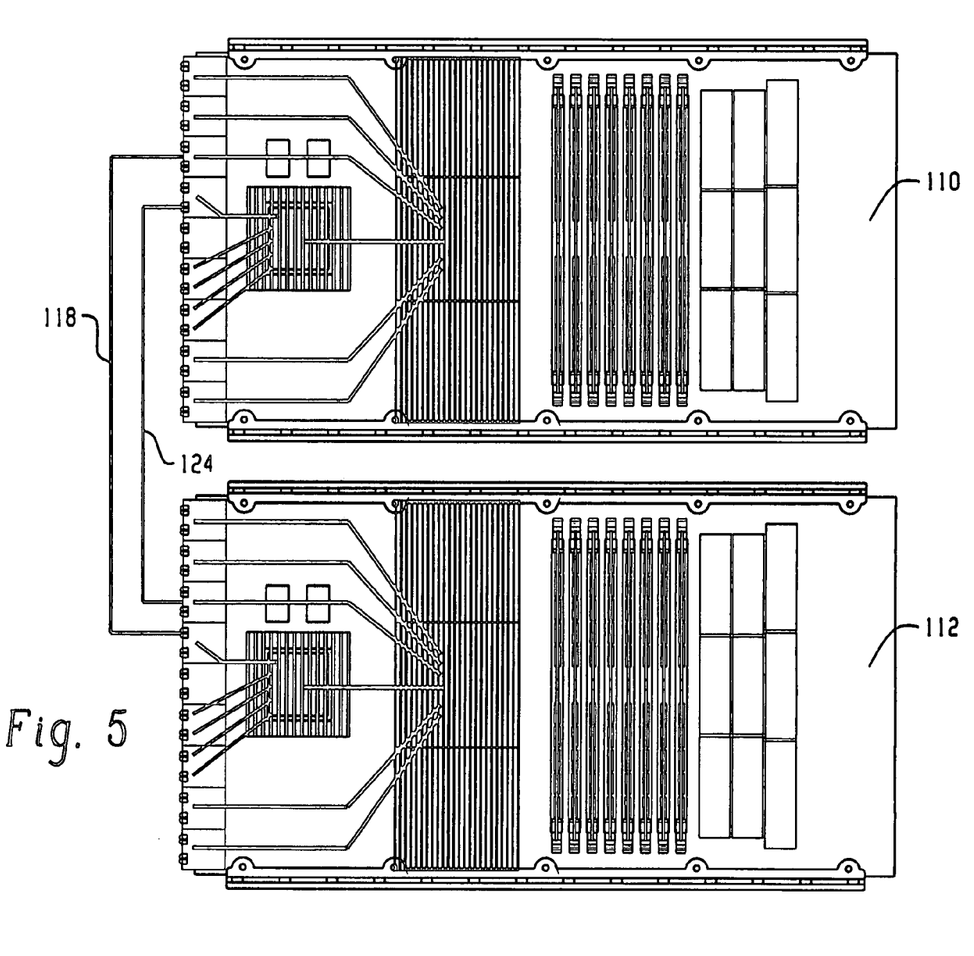
FIG. 5 is a top or plan view of an exemplary cell configuration of two cell memory boards.
Figure 5A:
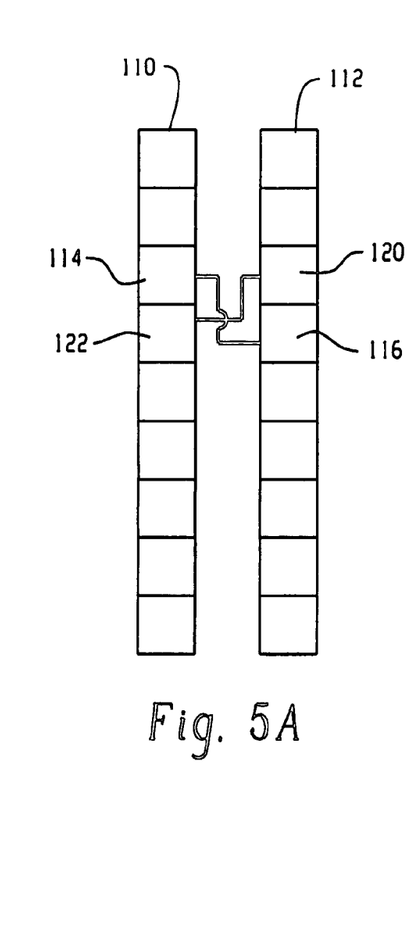
FIG. 5A is a connector section interface view of the two cell memory board configuration depicted in FIG. 5.

Referring to FIGS. 5 and 5A, two cell memory boards 110 and 112, which may be the same or similar to the cell memory board described in connection with FIGS. 1 and 2 herein above, are connected together to configure a cell building block for a midrange multi-processor server. In the present embodiment, the two cell memory boards 110 and 112 are combined by connecting a CSI Link connector section 114 of the top connector sections of board 110 to the Agent CSI Link connector section 116 of board 112 via a wire cable 118, for example, and by connecting a CSI Link connector section 120 of the top connector sections of board 112 to the Agent CSI Link connector section 122 of board 110 via a wire cable 124, for example. The configured cell of this arrangement will provide two processor ICs and an associated processor agent and memory for each. Accordingly, building block cells of the exemplary midrange multi-processor server would use only cell memory boards of the set.

Figure 6:
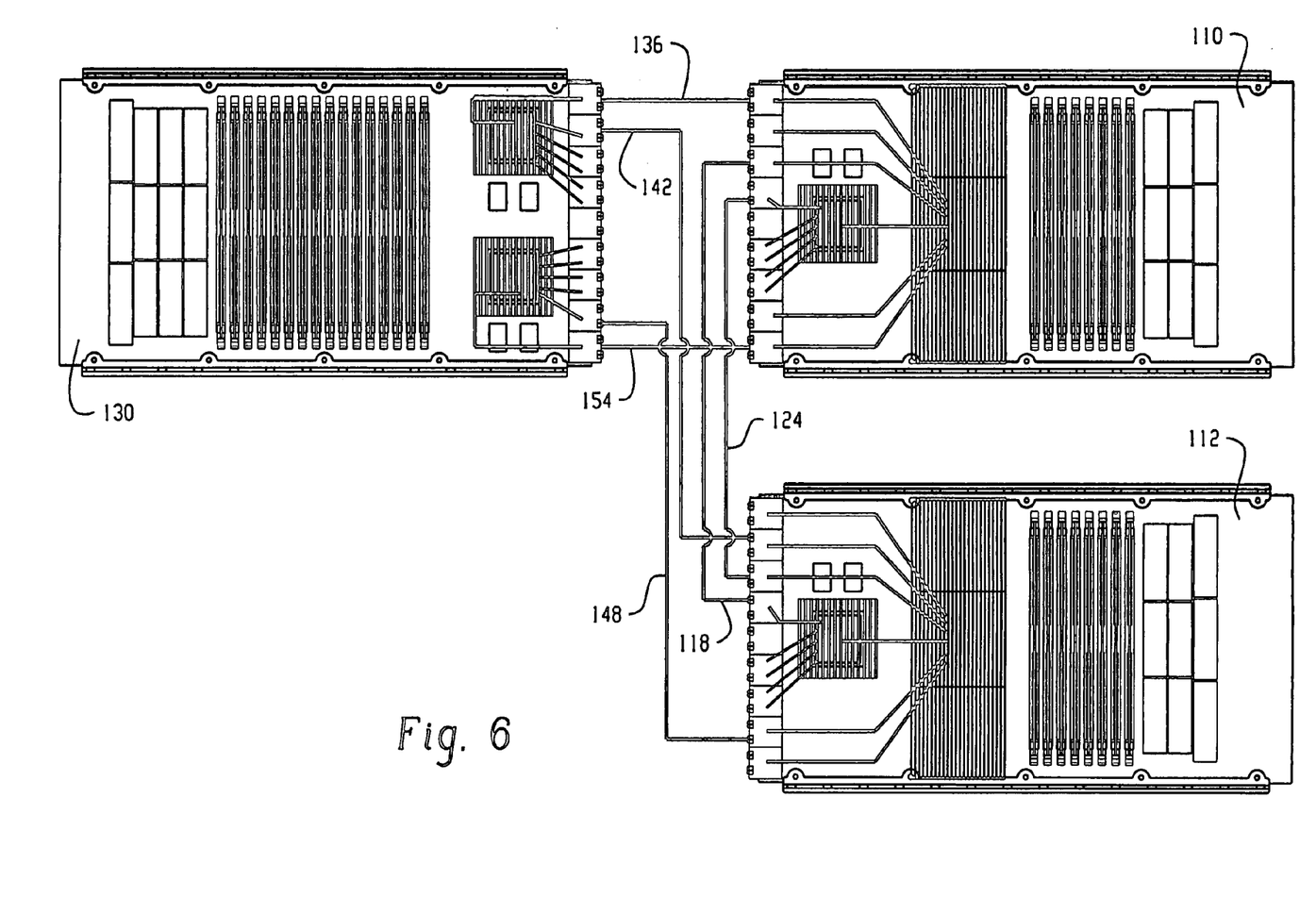
FIG. 6 is a top or plan view of an exemplary cell configuration of two cell memory boards and a memory expander board.
Figure 6A:
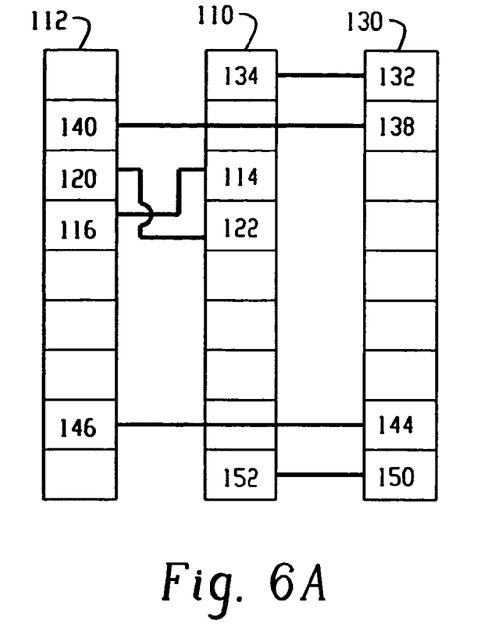
FIG. 6A is a connector section interface view of the two cell memory board and memory expander board configuration depicted in FIG. 6.

For an exemplary high end server application, a cell may be configured by combining two of the exemplary cell memory boards of the type described supra with a memory expander board of the type described supra as shown by way of example in the plan view of FIG. 6 and the connector section interface view of the three boards of FIG. 6A. Referring to FIGS. 6 and 6A, the two cell memory boards 110 and 112 will be connected in the same manner as described for the embodiment of FIGS. 5 and 5A. Accordingly, the reference numerals used for the two cell memory boards of the embodiment of FIGS. 5 and 5A will remain the same for like elements in FIGS. 6 and 6A.

To complete the cell configuration for the exemplary high end server, a memory expander board 130 is combined with the two cell memory boards 110 and 112 by: connecting one Agent CSI Link connector section 132 of the top pair of board 130 to a CSI link connector section 134 of the top connector sections of board 110 over a wire cable 136; connecting the other 138 of the top Agent CSI Link connector sections of board 130 to a CSI Link connector section 140 of the top connector sections of board 112 over a wire cable 142; connecting one Agent CSI Link connector section 144 of the bottom pair of board 130 to a CSI link connector section 146 of the bottom connector sections of board 112 over a wire cable 148; and connecting the other 150 of the bottom Agent CSI Link connector sections of board 130 to a CSI Link connector section 152 of the bottom connector sections of board 110 over a wire cable 154. This cell configuration allows each of two processor ICs to be coupled to two processor agent ICs and their associated memory DIMMs. Thus, each processor IC of a cell of the foregoing described configuration may have double the memory and twice the agent processing capacity suitable for a high end server application.

Another possible cell configuration for a high end server application may be to substitute a third cell memory board 160 for the memory expander board 130 in the cell configuration example of FIGS. 6 and 6A, thus rendering a unique three processor logical cell configuration which allows a common midplane for the system. In addition, each cell memory board of this embodiment is replaceable should an upgrade or new revision become available. This exemplary cell arrangement is depicted in the plan view of FIG. 7 and connector interface view of FIG. 7A. This logical cell configuration comprises three cell memory circuit boards 110, 112 and 160. Each such circuit board is the same or similar to the cell memory board described herein above in connection with FIGS. 1 and 2 and comprises: a single processor; a single processor agent coupled electrically to said single processor; and a plurality of memory modules coupled electrically to said single processor agent.

Figure 7:
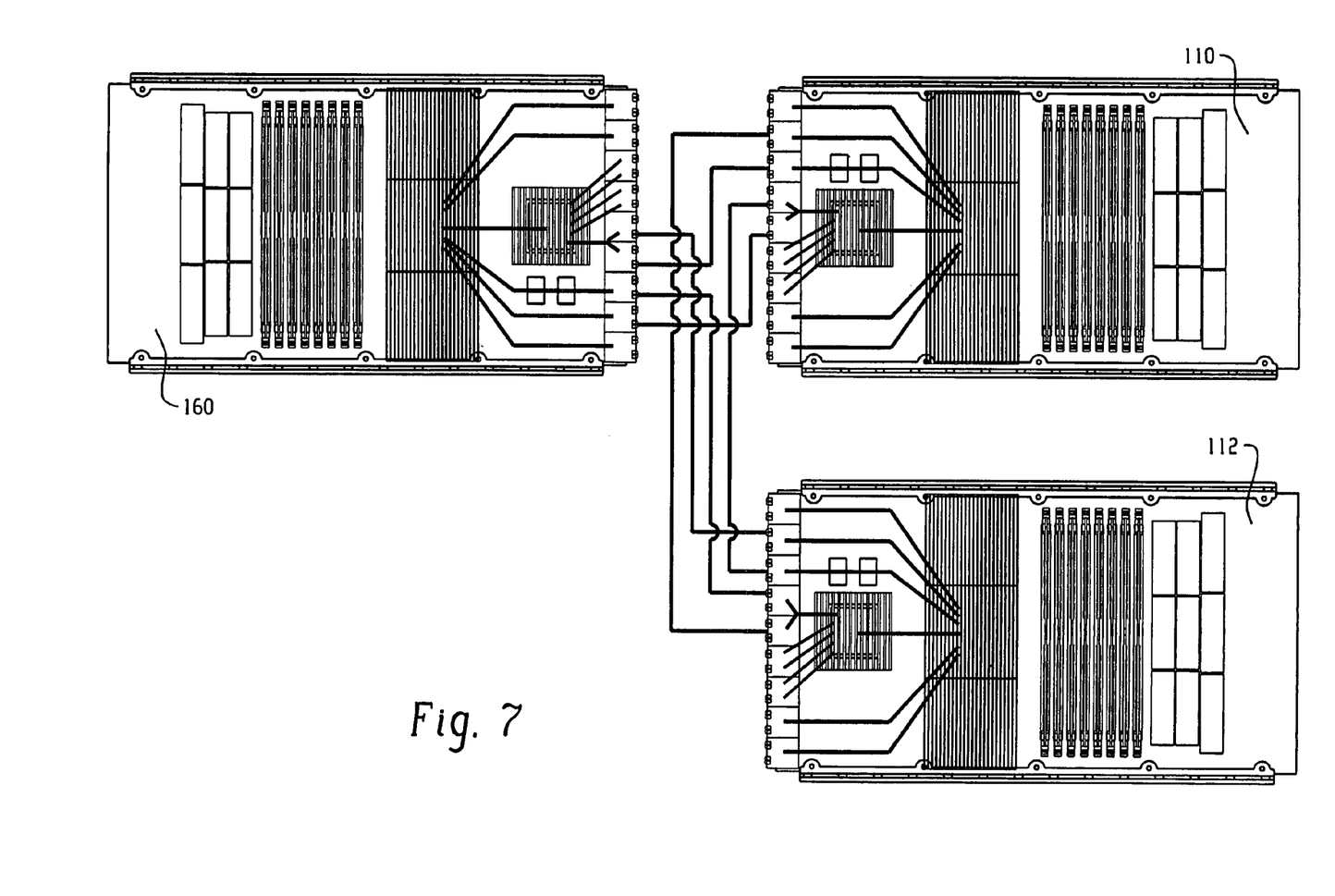
FIG. 7 is a top or plan view of an exemplary cell configuration of three cell memory boards.
Figure 7A:
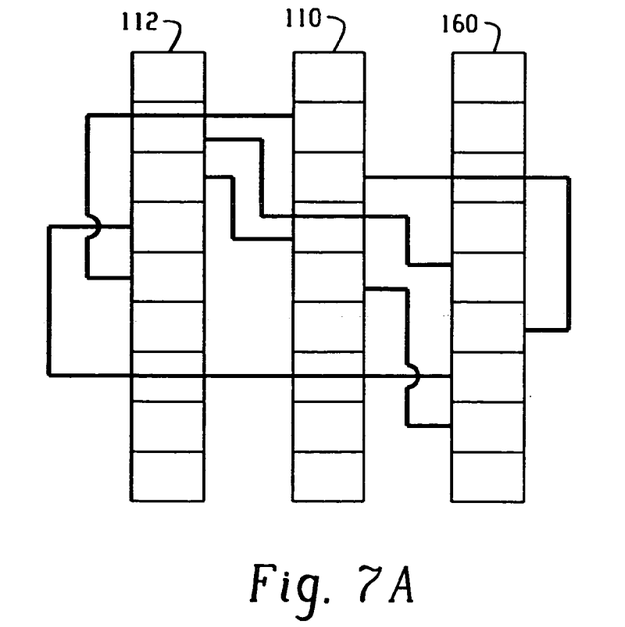
FIG. 7A is a connector section interface view of the three cell memory board configuration depicted in FIG. 7.

As shown in FIGS. 7 and 7A, the three cell memory boards 110, 112 and 160 are inter-connected together via CSI Links in such a manner to form an electrical connection from the single processor of each of said three circuit boards to at least one processor agent of the other two circuit boards. In the present example, each processor agent of a board is connected to the single processors of both of the other two boards via respective CSI Links. It is understood that this embodiment is exemplary of a three processor logical cell configuration and that other connections among the three boards are possible without deviating from this aspect of the present invention.

While the various exemplary cell configurations described herein above combine the boards of the set through wire cable connections, it is understood that this was presented merely by way of example and that the inter-coupling between boards to accomplish the cell configuration may be accomplished through any number of different ways without deviating from the broad principles of the present invention. For example, the board interconnections may be embodied through backplane connections whereby cells are configured when the appropriate boards are plugged into their respective slots of the backplane.

In the present embodiment, the weight of each board of the set may be kept between ten and thirteen pounds and the boards may have a footprint of less than one-half of a panel, and more preferably one-third of a panel. A connection system of forty-five to fifty differential pairs per inch would also be preferable and could be satisfied through use of a Tyco connector of the model HMZd that has 40 differential pairs per inch.

While the various aspects of the present invention have been described herein above in connection with a plurality of embodiments, it is understood that such embodiments are merely presented by way of example and should not be considered limiting in any way. Rather, the present invention should be construed in breadth and broad scope in accordance with the recitation of the claims appended hereto.

What is claimed is:

1. A cell configuration for a multi-processor system, said cell configuration comprising:
  a first circuit board comprising:
    a first single processor;
    a first single processor agent coupled electrically to said first single processor; and
    a plurality of memory modules coupled electrically to said first single processor agent; wherein memory request from said first processor to said plurality of memory modules passes through said first single processor agent;
  a second circuit board comprising:
    a second single processor;
    a second single processor agent coupled electrically to said second single processor; and
    a plurality of memory modules coupled electrically to said second single processor agent; wherein memory requests from said second processor to said plurality of memory modules passes through said second single processor agent; and
  wherein said first and second circuit boards are inter-connected in such a manner to form an electrical connection between the first single processor of said first circuit board and the second single processor agent of said second circuit board allowing memory request from said first processor to pass through said second single processor agent and an electrical connection between the second single processor of said second circuit board and the first single processor agent of said first circuit board allowing memory request from said second processor to pass through said first single processor agent.

2. The cell configuration of claim 1 wherein each first and second circuit board includes at least one power regulation module.

3. The cell configuration of claim 1 wherein each single processor of the first and second circuit boards includes a single processor integrated circuit.

4. The cell configuration of claim 1 wherein each single processor agent of the first and second circuit boards include a single processor agent integrated circuit.

5. The cell configuration of claim 1 wherein each memory module of the plurality of the first and second circuit boards includes a dual in-line memory module.

6. The cell configuration of claim 1 wherein each of the first and second circuit boards includes a plurality of board connectors that are coupled electrically to the single processor and single processor agent of the corresponding board; and wherein the first and second circuit boards are inter-connected through the plurality of board connectors of each board.

7. The cell configuration of claim 1 wherein the first and second circuit boards are inter-connected through a backplane arrangement.

8. A cell configuration for a multi-processor system, said cell configuration comprising:
two first circuit boards, each first circuit board comprising:
a first single processor;
a first single processor agent coupled electrically to said first single processor; and
a plurality of memory modules coupled electrically to said first single processor agent; wherein memory requests from said first processor to said plurality of memory modules passes through said first single processor agent;
a second circuit board comprising:
a second processor agent;
a second plurality of memory modules coupled electrically to said second processor agent;
a third processor agent; and
a third plurality of memory modules coupled electrically to said third processor agent; and
wherein said two first circuit boards and said second circuit board are inter-connected together in such a manner to form:
an electrical connection from the single processor of one of said first circuit boards to the processor agent of another of said first circuit boards and to the second and third processor agents of said second circuit board allowing memory requests from said single processor of one of said first circuit boards to pass through said processor agent of another of said first circuit boards and said second and third processor agents of said second circuit board, and
an electrical connection from the first single processor of said other first circuit board to the processor agent of said one first circuit board and to the second and third processor agents of said second circuit board allowing memory requests from said first single processor of said one first circuit board to pass through said processor agent of said one of first circuit board and said second and third processor agents of said second circuit board.

9. The cell configuration of claim 8 wherein each of the first circuit boards and second circuit board includes at least one power regulation module.

10. The cell configuration of claim 8 wherein each single processor of the first circuit boards includes a single processor integrated circuit.

11. The cell configuration of claim 8 wherein each single processor agent of the first and second circuit boards include a single processor agent integrated circuit.

12. The cell configuration of claim 8 wherein each memory module of the plurality of the first and second circuit boards includes a dual in-line memory module.

13. The cell configuration of claim 8 wherein each of the first circuit boards includes a plurality of board connectors that are coupled electrically to the single processor and single processor agent of the corresponding board; wherein the second circuit board includes a plurality of board connectors that are coupled electrically to the second and third processor agents thereof; and wherein the first circuit boards and second circuit board are inter-connected through the plurality of board connectors of each board.

14. The cell configuration of claim 8 wherein the first circuit boards and second circuit board are inter-connected through a backplane arrangement.

15. A cell configuration for a multi-processor system, said cell configuration comprising:
three circuit boards, each circuit board comprising:
a single processor;
a single processor agent coupled electrically to said single processor; and
a plurality of memory modules coupled electrically to said single processor agent; wherein memory requests from said single processor to said plurality of memory modules passes through said single processor agent;
and
wherein said three circuit boards are inter-connected together in such a manner to form an electrical connection from the single processor of each of said three circuit boards to at least one processor agent of the other two of said three circuit boards allowing memory request from said single processor of each of said three circuit boards to pass through said at least one processor agent of the other two of said three circuit boards.

16. The cell configuration of claim 15 wherein the single processor agent of each circuit board is connected to the single processor of both of the other two circuit boards.

17. The cell configuration of claim 15 wherein each single processor of the three circuit boards includes a single processor integrated circuit.

18. The cell configuration of claim 15 wherein each single processor agent of the three circuit boards include a single processor agent integrated circuit.

19. The cell configuration of claim 15 wherein each memory module of the plurality of the three circuit boards includes a dual in-line memory module.

20. The cell configuration of claim 15 wherein each of the three circuit boards includes a plurality of board connectors that are coupled electrically to the single processor and single processor agent of the corresponding board; and wherein the three circuit boards are inter-connected through the plurality of board connectors of each board.

21. The cell configuration of claim 15 wherein the three circuit boards are inter-connected through a backplane arrangement.

22. A cell configuration for a multi-processor system, said cell configuration comprising:
- a first means comprising: a first single processor; a first single processor agent for communicating with said first single processor; and a plurality of memory modules for communicating with said first single processor agent; wherein memory requests from said first single processor to said plurality of memory modules passes through said first single processor agent;
- a second means comprising: a second single processor; a second single processor agent for communicating with said second single processor; and a plurality of memory modules for communicating with said second single processor agent; wherein memory requests from said second single processor to said plurality of memory modules passes through said second single processor agent; and
- said first means being coupled to said second means for permitting communication between said first single processor and said second single processor agent allowing memory requests from said first single processor to pass through said second single processor agent and for permitting communication between said second single processor and said first single processor agent allowing memory requests from said second single processor to pass through said second first processor agent.

* * * * *

UNITED STATES PATENT AND TRADEMARK OFFICE
CERTIFICATE OF CORRECTION

PATENT NO. : 7,457,128 B2
APPLICATION NO. : 11/187302
DATED : November 25, 2008
INVENTOR(S) : Eric C. Peterson Page 1 of 1

It is certified that error appears in the above-identified patent and that said Letters Patent is hereby corrected as shown below:

In column 2, line 60, delete "acient" and insert -- agent --, therefor.

In column 6, line 52, in Claim 1, delete "request" and insert -- requests --, therefor.

In column 7, line 1, in Claim 1, delete "request" and insert -- requests --, therefor.

In column 7, line 6, in Claim 1, delete "request" and insert -- requests --, therefor.

In column 8, line 46, in Claim 15, delete "request" and insert -- requests --, therefor.

Signed and Sealed this

Fourteenth Day of April, 2009

JOHN DOLL
*Acting Director of the United States Patent and Trademark Office*